United States Patent [19]

Boyd

[11] 4,024,027
[45] May 17, 1977

[54] FRACTIONATION HEAT BALANCE CONTROL SYSTEM

[75] Inventor: David M. Boyd, Clarendon Hills, Ill.

[73] Assignee: UOP Inc., Des Plaines, Ill.

[22] Filed: Dec. 29, 1975

[21] Appl. No.: 644,989

[52] U.S. Cl. .......................... 203/2; 203/DIG. 18; 202/160; 202/206; 196/132; 208/DIG. 1; 203/99; 203/DIG. 19

[51] Int. Cl.² ......................................... B01D 3/42

[58] Field of Search ............... 203/2, DIG. 18, 99, 203/DIG. 19; 202/206, 160; 196/132; 208/DIG. 1; 260/674 R

[56] References Cited

UNITED STATES PATENTS

| | | | |
|---|---|---|---|
| 2,580,651 | 1/1952 | Boyd | 203/2 |
| 2,684,326 | 7/1954 | Boyd | 203/2 |
| 3,464,895 | 9/1969 | Boyd | 203/2 |
| 3,475,287 | 10/1969 | DeGraff | 203/2 |
| 3,830,698 | 8/1974 | Kleiss | 203/2 |
| 3,855,074 | 12/1974 | Mosler | 202/206 |

Primary Examiner—Wilbur L. Bascomb, Jr.
Attorney, Agent, or Firm—James R. Hoatson, Jr.; Robert W. Erickson; William H. Page, II

[57] ABSTRACT

Heat balance of a fractionation column is maintained through the utilization of differential temperature sensors located at selected points in the height of the column. Signals representative of three delta-T's are employed in regulating the quantity of reflux to the rectification zone and the enthalpy (heat-input content) of the reboiled liquid bottoms stream. With respect to the former, two differential-temperature signals are used; these result from four temperature sensors vertically-spaced along virtually the entire height of the fractionation column.

3 Claims, 1 Drawing Figure

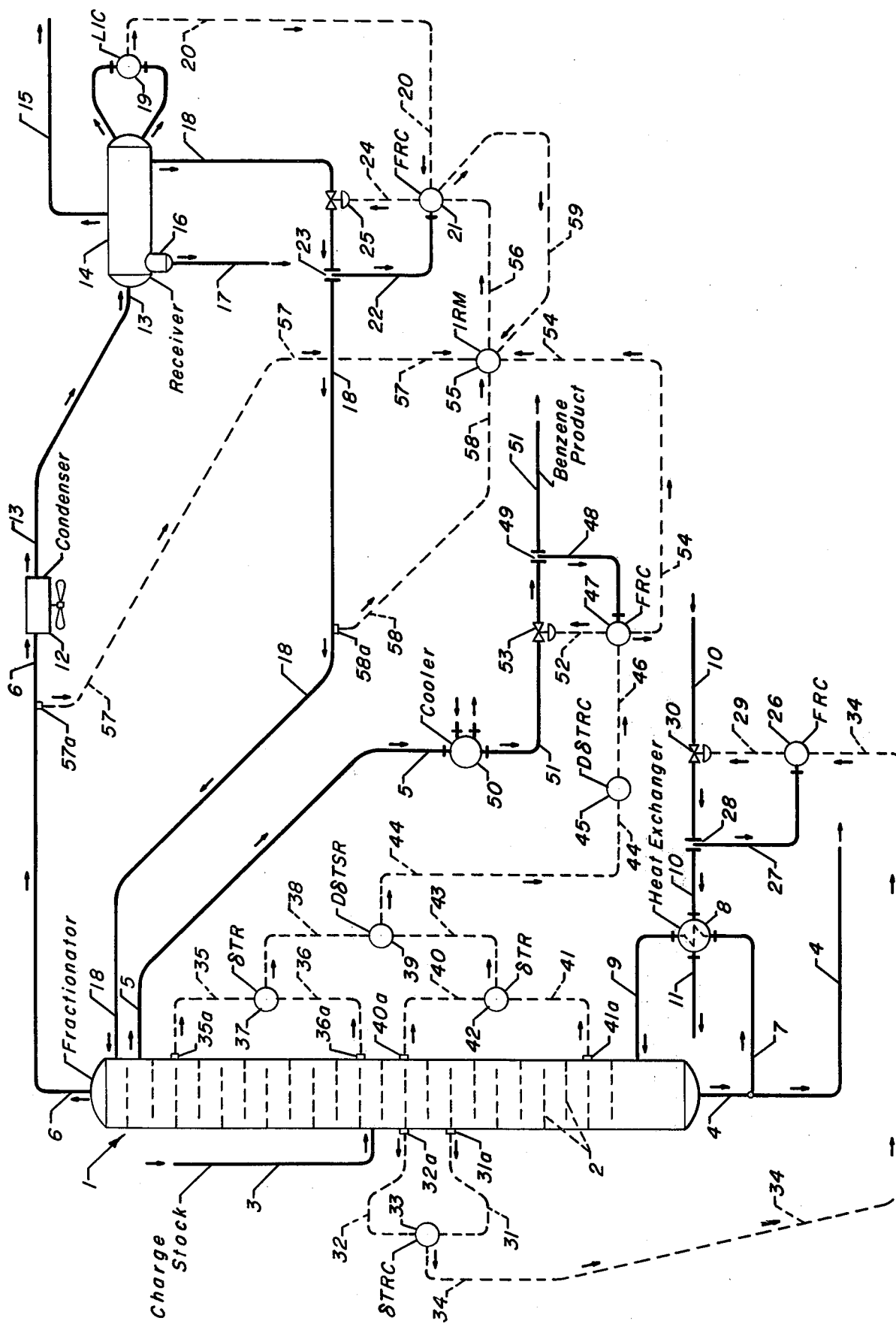

FRACTIONATION HEAT BALANCE CONTROL SYSTEM

APPLICABILITY OF INVENTION

My inventive concept, as herein more fully described, encompasses a control system, and method for maintaining the heat balance of a fractionation column functioning to separate a mixed-component feed stream. The system is especially applicable where the intended product stream is characterized as a substantially-pure component — e.g. the recovery of benzene from a mixture of aromatic hydrocarbons. The fractionation column must be maintained in heat balance in order to attain the specified product composition, whether a bottoms product, overhead product, side-cut product, or where both bottoms and overhead product compositions are specified. For example, in recovering benzene from a mixture thereof with toluene and the various xylenes, proper heat balance, consistent with feed stock composition, will result in a substantially-pure overhead benzene stream and, simultaneously, minimal benzene in the bottoms product.

In the present specification and the appended claims, the use of the term "fractionation column" synonymously alludes to "rerun column", "distillation column", "stripping column", etc. Generally, in a normal fractionation/separation technique, a mixed, or multi-component feed stream is introduced intermediate the ends of the column, often at about its mid-point. The fractionation column is a vertically-disposed cylindrical chamber having a plurality of spaced-apart trays, or decks which effect the necessary intimate mixing of countercurrently-flowing liquid and vapors within the column. Heat is supplied to the column through the use of a reboiler heater, or heat-exchanger, in communication with the lower reboiler section of the column. The reboiler section contains an inventory of liquid material, generally maintained by way of a suitable liquid-level controller, and a portion thereof is withdrawn, partially vaporized in the external reboiler heater and returned to the column generally at a point just below the lowermost tray, or deck. Reflux is supplied to the column by cooling and condensing an overhead product stream, and returning a portion thereof through a locus above the uppermost tray, or deck. These two streams, the reflux and reboiled bottoms liquid, constitute the two major sources of heat-input to the column, the third being the feed stream from which a desired overhead or bottoms product, or both, is to be recovered. Also, as utilized herein, the terms "heat-input", and "heat-input content" of a stream, allude to enthalpy, and are intended to connote the quantity of energy, per unit of time, introduced into the column by a given stream, whether returned to the column at a lower temperature than when removed (reflux), or at a higher temperature than when removed (reboiled liquid). For example, considering the feed stream, at a given composition and temperature, it will have a given enthalpy expressed as BTU's per pound. Depending upon its flow rate, expressed as lb./hr., it will supply a given heat-input to the column, expressed as BTU/hour. Any change in temperature, flow rate, or composition, will change the enthalpy thereof. Likewise, a change in the flow rate of the reflux stream will affect its contribution of enthalpy to the column. With respect to the reboiled liquid bottoms, its enthalpy contribution may be varied via its flow rate, or the flow rate of the heat-exchange medium employed to partially vaporize it. Although many variables, relevant to the feed stream, reflux stream and returned vaporized bottoms liquid, have an effect upon thermal balance, perhaps the most pronounced is the effect of heat-input via the reboiler section. This source of enthalpy takes two forms: (i) the increased sensible heat of the liquid returned to the reboiler section and, (ii) the latent heat of vaporization contained in the vapors generated in the reboiler heater. Since the latter constitutes the source of the greatest quantity of heat input, it must necessarily be subject to close control and/or regulation. Furthermore, since the overall separation efficiency is largely dependent upon heat-input to the reboiler section, any thermal balance control system and method must take into account those loci within the fractionation column where the effects of varied reboiler section heat-input are most pronounced and important. The present invention directs itself to such a control system and method.

Although understood by those skilled in the art of separation via fractionation, the definition of several additional terms employed herein is believed to be warranted. The "reboiler section" of a distillation column is that portion below the lowermost tray, or deck, while the fractionation section is that portion of the column above the lowermost tray. The "stripping section" includes those trays between the lowermost tray and the feed tray, and the "rectification section" refers to those trays above the feed tray.

The present invention is utilized to maintain the specified composition, or a composition characteristic of the product stream withdrawn from one end of a fractionation column. As such, it is applicable to virtually all separations of a mixed-component feed stream effected in fractionation zones, whether the specified product constitutes the overhead stream, the bottoms liquid, or both. Distillation techniques are extensively employed throughout the petroleum and petrochemical industries for the separation and recovery of select fractions of the feed stock, or of substantially pure compounds. For example, in the wellknown catalytic reforming process, the charge to the reaction zone is often initially "rerun" in order to provide an overhead fraction having a specified end boiling point. In a solvent-extraction process, wherein polar hydrocarbons are separated from a mixture thereof with non-polar hydrocarbons, the ultimately recovered polar hydrocarbon product — i.e. benzene, toluene and the xylenes — are separated in an initial distillation column to provide a substantially pure benzene overhead product. My inventive concept, and the control system and fractionation method encompassed thereby, is applicable to the foregoing exemplary distillation separations, as well as others which will be recognized by those having the requisite skill in the art.

OBJECTS AND EMBODIMENTS

A principal object of my invention is to provide an efficient method for fractionating a feed stream having mixed components. A corollary objective is directed toward maintaining a fractionation column in thermal balance consistent with feed stream characteristics.

More specifically, it is an object of the present invention to afford a control system which maintains thermal balance and simultaneously enhances separation efficiency.

Briefly, these objects are attained by sensing six temperatures at selected points throughout the fractionation column. The six temperatures are segregated into three specific pairs, each of which is used to measure a temperature differential (delta-T) between two points. The first pair of temperature sensing means are vertically-spaced below the feed locus (or feed tray), and both are proximate thereto. A signal, representative of the delta-T between these points, is utilized to regulate the enthalpy of the reboiler bottoms liquid portion which is partially vaporized and returned to the reboiler section. A second pair of temperature sensors are vertically-spaced below the locus of feed introduction; one of the sensors is proximate to the feed locus while the other is proximate to the locus through which the partially vaporized liquid bottoms material is returned to the reboiler section of the column. A signal, representative of the delta-T between these two remote points, is transmitted to a delta-T computing (summing) means. The third pair of temperature sensors are vertically-spaced above the feed locus; one is proximate to the feed locus, while the other is proximate to the locus through which the reflux is returned to the rectification section of the column. Another signal, representing the delta-T between these two remote points, is also transmitted to the delta-T summing means. The summing means generates still another signal representing the difference these two delta-T's, and this last signal is employed to regulate the quantity of reflux to the column. As hereinafter indicated, this control system is not found in the appropriate prior art.

One embodiment of my invention, therefore, directs itself to a control system intended for utilization in a fractionation column wherein (i) a mixed-component feed stream is introduced through a locus intermediate the top and bottom thereof; (ii) liquid bottoms material is recovered from the lower end of said column, and at least a portion thereof is partially vaporized and returned to the reboiler section of said column; and, (iii) overhead material is recovered from the upper end of said column, condensed and at least a portion thereof returned to the rectification section of said column as a reflux stream, which control system comprises, in cooperative combination: (a) a first pair of vertically-spaced temperature sensors below said feed locus and proximate thereto, a first differential-temperature measuring device connected to said first pair of temperature sensors and, first control means co-acting with said first delta-T measuring device and regulating the degree to which the portion of said liquid bottoms material is vaporized; (b) a second pair of vertically-spaced temperature sensors below said feed locus, one of which is proximate thereto and the second of which is proximate to the locus through which said partially vaporized liquid bottoms material is returned to said reboiler section and, a second differential-temperature measuring device connected to said second pair of temperature sensors; (c) a third pair of vertically-spaced temperature sensors above said feed locus, one of which is proximate thereto and the second of which is proximate to the locus through which said reflux stream is returned and, a third differential-temperature measurng device connected to said third pair of temperature sensors; and, (d) a differential-temperature computing device connected to both of said second and third delta-T measuring devices, and co-acting with second control means for regulating the quantity of said overhead material returned to said column as said reflux stream.

With respect to the techniques employed in recovering an overhead product stream from, and introducing reflux to the rectification section of the fractionation column, my invention is intended to apply to three of the more common. First, a single vaporous overhead stream is recovered, at least partially condensed and introduced into a receiver, from which a reflux portion is removed on flow control, the remainder being withdrawn as product by way of liquid level within the receiver. In another technique, the reflux is returned responsive to liquid level control, while the overhead product is recovered in response to the control system. A third technique involves withdrawing the overhead product, as a liquid from a tray below the reflux return locus, on a flow control basis. The vaporous overhead stream is condensed, introduced into the receiver and refluxed in response to a liquid level control within the receiver.

A more specific embodiment of the present invention involves a control system for use in a fractionating column wherein (i) a mixed-component feed stream is introduced through a locus intermediate the top and bottom thereof; (ii) liquid bottoms material is recovered from the lower end of said column, and at least a portion thereof is partially vaporized and returned to the reboiler section of said column; (iii) a vaporous overhead stream is withdrawn from the upper end of said column, is at least partially condensed and returned to the rectification section of said column as a reflux stream; and, (iv) a liquid overhead stream is withdrawn from said column, through a locus below that through which said reflux stream is returned, as an overhead product stream, which control system comprises, in cooperative combination: (a) a first pair of vertically-spaced temperature sensors below said feed locus and proximate thereto, a first differential-temperature measuring device connected to said first pair of temperature sensors and, first control means co-acting with said first delta-T measuring device and regulating the degree to which the portion of said liquid bottoms material is vaporized; (b) a second pair of vertically-spaced temperature sensors below said feed locus, one of which is proximate thereto and the second of which is proximate to the locus through which said partialy vaporized liquid bottoms material is returned to said reboiler section and, a second differential-temperature measuring device connected to said second pair of temperature sensors; (c) a third pair of vertically-spaced temperature sensors above said feed locus, one of which is proximate thereto and the second of which is proximate to the locus through which said overhead reflux is returned and, a third differential-temperature measuring device connected to said third pair of temperature sensors; (d) a fourth pair of temperature sensors sensing the temperature of said overhead vaporous stream and the temperature of said returned reflux stream, a fourth differential-temperature measuring device connected to said fourth pair of temperature sensors and co-acting with second control means for regulating the quantity of said reflux stream; and, (e) a differential-temperature computing device connected to both of said second and third delta-T measuring devices, co-acting with third control means for regulating the quantity of said overhead product stream, and co-acting with said second control means for regulating the quantity of said reflux stream.

Other objects and embodiments, although not specifically delineated herein, will become evident from the following, more detailed description of my invention, and the control system and fractionation technique which it encompasses.

PRIOR ART

Temperature control at some point in a fractionation column, to maintain product composition at that point, in conjunction with regulation of the enthalpy (heat-input) of a stream introduced into the column, must be acknowledged as old in the art of separation via distillation. Generally, the heat-input content of either the returned reflux stream, or of the partially vaporized liquid bottoms material is regulated. The enthalpy of the feed stream itself is seldom varied directly via control means. Similarly, candor compels recognition of the fact that the published literature is replete with a myriad of techniques designed to afford some measure of control over some aspect of product separation in a fractionation zone. In view of the voluminous nature thereof, no attempt will be made herein to delineate exhaustively the appropriate prior art; a few typical illustrations will suffice. One prior art technique, now since improved upon, involves instituting an energy balance around the reboiler heater; a similar scheme computes the energy balance around the reboiler section of the column. While affording a measure of control, both techniques entail many measurements, accompanied by an extremely difficult energy balance, and are comparatively imprecise. Other control techniques involve controlling the flow of fuel medium to the reboiler heater in response either to the temperature of the heated material returned to the reboiler section, or to the rate of mixed-phase flow. For the latter method, the quantity of liquid reboiler bottoms material introduced into the reboiler heater must be pre-set by way of flow control means. Flow control of the heated material re-entering the reboiler section suffers from the disability of not being capable of precisely measuring vapor flow and depends upon a constant flow rate to the heater.

Another prior art technique involves temperature measurement and control at the point from which the desired product stream is withdrawn, accompanied by regulation of either the heat-input at that point, or at some remote point. To illustrate, if the overhead product is specified as to some composition characteristic, the temperature at some proximate point is sensed and controlled either by regulating the heat-input to the reboiler section, or by adjusting the quantity of reflux to the rectification zone of the column.

Such basic techniques have since been improved upon as illustrated, for example, by the double differential-temperature control system found in U.S. Pat. No. 2,580,651 (Cl. 203-2), issued Jan. 1, 1952. Here the overhead product composition is specified, and the temperature gradient within the column is monitored around the feed locus. A first delta-T is measured by two vertically-spaced temperature sensors above the feed locus, both of which are proximate thereto. A second delta-T is measured through the use of two vertically-spaced temperature sensors below the feed locus, again both of which are proximate thereto. Appropriate signals are transmitted to summing means which develops a signal representing the difference between the two delta-T's. This last signal is employed to adjust the heat-input to the reboiler section. Disclosed is the fact that the reboiler section heat-input could be pre-set and the signal from the summing means used to control the quantity of reflux to the rectification zone of the column. It is noteworthy that no measurements of the temperatures proximate to the point of immediate effect of the variable being adjusted, or proximate to the locus of desired product withdrawal, are taken.

In U.S. Pat. No. 2,684,326 (Cl. 203-2), issued July 20, 1954, a similar technique is disclosed, wherein two delta-T's are measured, one above and one below the feed locus. Again, all four temperature sensors are located proximate to the feed locus, and are used to control the heat distribution at both ends of the column. In one embodiment, the double differential-temperature signal controls the reflux rate, while a single differential-temperature signal (from below the feed locus) controls reboiler section heat-input. Alternatively, the single differential-temperature signal (from above the feed locus) regulates the reflux rate, whereas the double differential-temperature signal adjusts the heat-input to the reboiler section. There is no indication, as above stated, of using differential temperatures based upon temperatures sensed at the locus of effect of the adjusted variable, or at a locus proximate to the point of desired product withdrawal.

More recently, U.S. Pat. No. 3,464,895 (Cl. 203-2), issued Sept. 2, 1969, describes a differential-temperature control technique founded upon sensing six temperatures within the fractionation column. The specified product is an overhead stream, and one pair of vertically-spaced temperature sensors measures the differential temperature, within the rectification zone, between two points, one of which is immediately below the locus through which the reflux is returned, and the second of which is about five trays below the reflux locus. The signal representing the resulting temperature differential is utilized to adjust the quantity of reflux returned to the column from the overhead receiver. All of the remaining four temperature sensors are situated below the feed tray, and are ultimately used to provide a signal which regulates the heat-input to the reboiler section. In accordance with the disclosed technique, the feed locus is immediately above tray 24 (out of 48 which are disposed in the column), and one pair of sensors is located at trays 25 and 28, providing a first delta-T; the second pair of temperature sensors are situated at trays 25 and 40, and provide a second delta-T which, in effect, brackets the first delta-T. The appropriate signals are transmitted to a summing relay which develops an output signal representative of the quotient of the first delta-T divided by the second delta-T. This signal is employed to adjust the heat-input to the reboiler section of the column. It should be noted that no temperature either below, or at the feed locus is considered in regulating the reflux rate. Furthermore, any effect which varying reflux rate induces with respect to temperatures proximate to the feed locus is only considered when subsequently adjusting heat-input to the reboiler section.

Shortcomings inherent in prior art fractionation control systems, exemplified by U.S. Pat. Nos. 2,580,651 and 2,684,326, are clearly overcome through the utilization of the present invention, wherein the effect of feed stream enthalpy change, whether resulting from varying temperature, composition, flow rate, or a combination thereof, upon the temperatures and compositions below the feed tray is considered when regulating both reflux rate and reboiler section heat-input. Additionally, the immediate effect of heat-input to the reboiler section is cojointly considered with enthalpy change of the feed stream in regulating the reflux rate.

The control system herein described also differs materially from that disclosed in U.S. Pat. No. 3,464,895 which employs a single differential-temperature signal to control the reflux rate and a bracketed double differential-temperature system to regulate heat-input to the reboiler section. Here no stripping section temperature, much less one proximate to the locus of heat-input to the reboiler section, is considered when regulating the reflux flow rate.

SUMMARY OF THE INVENTION

The principle that the temperature of a boiling mixture is a direct function of its composition, underlies control systems intended for use in conjunction with fractionation facilities. In their basic form, a temperature at a selected point in the distillation column is controlled to maintain the composition of the material at the point constant. Generally, the temperature control point is selected above the column feed tray if it is desired to maintain the overhead product composition, and below the feed tray if the specified composition is direct toward the column bottoms product. In certain circumstances, however, the selected locus of the temperature control point inherently gives rise to a tradeoff between the sensitivity of control and response time of the system. For enhancement of control sensitivity, the temperature control point should be such that a relatively minor variation in product composition corresponds to a comparatively large temperature change at that control point. Conversely, to minimize the system's response time (lag time), the temperature control point should be close to the locus of immediate effect of the variable which is to be regulated. For example, if the reflux flow rate is to be adjusted by the temperature controller, it is preferable to locate the temperature sensing point in the upper section of the column, whereas, if the heat-input to the reboiler section is the regulated variable, the temperature sensing point should be a locus in the lower section of the column. Certainly, the differential-temperature control systems, hereinbefore set forth, have done much to improve upon the basic technique outlined above, and have improved separation efficiency while improving the relationship between response time and control sensitivity. The control system and method of the present invention offers additional improvement with respect to sensitivity of control and response time, and further improves upon efficiency of separation.

As hereinbefore stated, there are two major sources of heat-input, or enthalpy, to a fractionation column. These are the overhead reflux and the partially vaporized liquid bottoms material returned to the reboiler section of the column. Of these, the major source is the partially vaporized bottoms material, generally considered to be the driving force behind the distillation operation. Control of this important variable is, therefore, essential to any successful control system. In accordance with the present method of maintaining a fractionation column in thermal balance, the heat-input, or enthalpy of this stream is regulated by sensing a temperature gradient, or differential temperature through the use of two temperature sensors which are vertically-spaced below the feed locus, and proximate thereto. This differential-temperature system reacts immediately to the effect of a change in feed stream enthalpy combined with any change in the liquid material downwardly flowing from the rectification section into the stripping section. The resulting adjustment of heat-input to the reboiler section is also virtually immediate, as contrasted to the relatively longer response time experienced if the adjustment in reboiler heat-input is delayed until the enthalpy effect immediately below the feed tray exerts an influence in, or proximate to the reboiler section.

Enthalpy changes of the feed stream, combined with the effect resulting from varying the heat-input to the reboiler, necessarily affect the operation of the rectification section of the column. Therefore, the present control system provides two vertically-disposed temperature sensors below the feed locus, one of which is proximate thereto, and the second of which is proximate to the locus through which the partially-vaporized bottoms material is returned to the reboiler section. These sense a first differential temperature across virtually the entire stripping section. Another pair of temperature sensors above the feed locus, one of which is proximate thereto, and the second of which is below and proximate to the locus through which the reflux stream is introduced, sense a second differential temperature across virtually the entire rectification section. Signals representing these two delta-T's are transmitted to a suitable delta-T summing means. The latter develops another signal representing the delta-T difference, and the reflux rate to the column is adjusted in response thereto.

As hereinbefore stated, reflux is supplied by first recovering a single overhead vaporous stream, condensing the same and introducing it into a so-called overhead receiver. The output signal from the summing means adjusts the quantity of condensed material returned as reflux, and the quantity of the remainder recovered as an overhead product is regulated in response to the liquid level in the receiver. In another system, the overhead product stream can be withdrawn as a liquid from a tray below the reflux, the quantity of liquid being controlled in response to the signal from the delta-T summing means. Overhead vapors are condensed, introduced into the overhead receiver and returned to the column in accordance with the liquid level in the receiver. In both techniques, the rate of reflux is adjusted responsive to the signal representing the delta-T difference, directly in the former, and indirectly in the latter.

With respect to the overhead vaporous stream, whether serving as "total reflux", or containing the ultimately recovered overhead product, it is condensed, prior to being introduced into the overhead receiver, either through the use of a condenser employing a relatively cold stream as the cooling medium, or by way of the well-known fin-fan cooler. Although the reflux from both types of condensing systems can be affected by atmospheric conditions, particularly sudden changes therein, the greater effect seems to occur when the vaporous material passes through a fin-fan cooler. In order to mitigate these adverse effects, an internal reflux modulating system has been employed wherein temperature sensors monitor the temperatures of the overhead vapors leaving the column and the liquid reflux returned thereto. Representative signals thereof are transmitted to an Internal Reflux Modulator (IRM) which also receives a signal representing the quantity of overhead material removed from the system as a product stream. The IRM is designed to compute the quantity of internal reflux, and develops a signal representative thereof. This signal is transmitted to the Flow Recorder Controller (FRC) which also receives a signal from the Level Indicating Controller (LIC) on the overhead receiver. These two signals adjust the setpoint of the FRC, and thus regulate the quantity of external reflux being returned to the column. The internal reflux monitoring system can be easily integrated with the present system as a combination which provides additional control where atmospheric conditions are a factor to be considered.

BRIEF DESCRIPTION OF DRAWING

In further describing the present control system and its method of operation, reference will be made to the accompanying drawing. It is understood that the drawing is presented solely for illustration purposes, and is not intended to be construed as limiting upon the scope and spirit of my invention as defined by the appended claims. Miscellaneous appurtenances, not required for a clear understanding of the inventive concept, have been eliminated, or reduced in number. Such items are well within the purview of one having the requisite skill in the art. For example, standard procedures dictate, with respect to the reboiler bottoms liquid, that the portion recovered through line 4 as a bottoms product is controlled by the level of liquid in the reboiler section. This control is not necessary to an understanding of the present invention, and is not, therefore, illustrated. Presented in the drawing is a fractionation column 1 having a feed conduit 3, a bottoms product conduit 4, an overhead product sidecut conduit 5, an overhead vaporous material conduit 6 and a reflux return conduit 18.

DETAILED DESCRIPTION OF DRAWING

Referring now to the drawing, fractionator 1 is shown as having a plurality of spaced-apart trays, or decks 2. In this illustration, the feed stream introduced through line 3 is a mixture of benzene, toluene and the xylenes, with the intended separation being the recovery of a substantially pure benzene overhead product while simultaneously recovering a bottoms product which is substantially benzene-free. The bottoms product in line 4 is withdrawn in response to liquid level control (not illustrated) in the reboiler section of column 1. The overhead product, in this illustration, is withdrawn as a liquid, from a tray near the top of the column which is below the top tray thereof, through line 5, while vaporous overhead material is withdrawn through line 6. This technique is utilized in aromatic hydrocarbon separations quite often in order to recover a substantially dry product free from lighter material.

A portion of the liquid bottoms material in line 4 is diverted through line 7 and introduced into a direct-fired heater, or heat-exchanger 8, wherein it is partially vaporized, prior to being returned to column 1 via conduit 9. The heat-exchange medium, generally a hotter stream from the process, or some other part of the refinery, is introduced by way of line 10, and exits from heat-exchanger 8 through line 11. Vaporous overhead material in line 6 is introduced thereby into fin-fan cooler 12, wherein it is at least partially condensed, and transferred via line 13 into overhead receiver 14. Lighter, non-condensible material is vented through line 15, and any water is removed through dip-leg 16 by way of line 17. Reflux is returned to column 1 via line 18, at a locus generally above the uppermost, or first perforated tray, or deck. The amount of reflux, in the present illustration, is controlled by monitoring the liquid hydrocarbon level in overhead receiver 14 through the use of a Level Indicating Controller (LIC) 19. A signal, representative of the liquid level is transmitted from LIC 19, via instrument line 20, to Flow Recorder Controller 21, and re-sets the adjustable setpoint thereof. The reflux flow rate is metered through conduit 22 and measuring means (an orifice plate) 23, and compared with the rate called for by FRC 21. An appropriate signal is transmitted via line 24 to control valve 25, and the opening thereof is adjusted in response thereto.

The heat-input, or enthalpy of the reboiler bottoms return through line 9, is controlled by monitoring the rate of steam, or other heat-exchange medium in line 10. FRC 26, also having an adjustable setpoint, receives an indication of the flow rate via conduit 27 and orifice plate 28. This is compared to the setpoint setting of FRC 26 and a signal is transmitted via line 29 to control valve 30, and the flow rate adjusted in response thereto.

The overhead product stream is withdrawn as a liquid, from a perforated tray below the reflux stream locus, through line 5, and introduced therethrough into cooler, or condenser 50. Cooled product is discharged through conduit 51, and ultimately recovered therefrom. The flow rate of benzene product in line 51 is controlled by FRC 47 communicating, via conduit 48, with orifice meter 49. The indicated flow rate is compared to that called for the adjustable setpoint of FRC 47, and an output signal transmitted through instrument line 52 to control valve 53, the opening of which is adjusted in response thereto.

Enthalpy changes in the feed stream, introduced through line 3, whether resulting from varied flow rate, temperature, composition, or any combination of these, is sensed by temperature sensors 31a and 32a. These two vertically-spaced sensors are both below the feed tray and proximate thereto; therefore, they sense the differential temperature, or temperature gradient at loci of immediate effect of the feed stream changes. The temperature sensors communicate, via lines 31 and 32, with Differential-Temperature Recorder Controller ($\delta$TRC) 33 which compares the sensed temperature differential with its setpoint indication. An output signal is developed and transmitted by way of instrument line 34 to FRC 26, the setpoint of which is adjusted accordingly; a signal, representing the difference between the flow rate of heating medium in line 10 and the adjusted setpoint, is transmitted through instrument line 29 to control valve 30. In this fashion, the enthalpy of the partially-vaporized reboiler bottoms liquid return is virtually immediately adjusted responsive to the varied differential temperature below the feed tray and proximate thereto, as a result of the feed stream enthalpy change.

A second pair of temperature sensors are vertically-spaced below the feed tray; as shown in the drawing, sensor 40a is proximate to the feed tray, while sensor 41a is proximate to the locus through which the partially-vaporized reboiler liquid is returned. Although sensor 40a is shown as sensing the same tray temperature as sensor 32a, such is not essential, or critical, but is preferred. With respect to sensor 41a, it is located above the lowermost tray, or deck, but not by more than about five trays, and not within the reboiler section itself. Therefore, it senses the temperature change resulting from the greater source of heat-input, that of the latent heat of vaporization. The temperatures sensed by sensors 40a and 41a are transmitted via instrument lines 40 and 41 to Differential Temperature Recorder ($\delta$TR) 42. The latter transmits a signal, representing the temperature differential between 40a and 41a, via instrument line 43 to Double Differential Temperature Summing Relay (D$\delta$TSR) 39.

The third pair of temperature sensors are vertically-spaced above the feed tray, one of which, 36a, being proximate to the feed tray, and the second of which, 35a, is proximate to the locus through which liquid reflux is returned to the column. Sensor 35a is located below the reflux return locus, and preferably also below the locus from which the overhead product stream is withdrawn through line 5. The temperatures sensed by sensors 35a and 36a are transmitted via instrument lines 35 and 36 to $\delta$TR 37 which, in turn, transmits a temperature differential signal, through line 38, to D$\delta$TSR 39. The latter develops an output signal representative of the difference between the two temperature differentials, and transmits this signal, via instrument line 44, to Double Differential Temperature Recorder Controller (D$\delta$TRC) 45. The latter develops a signal which is transmitted to FRC 47, the setpoint of which is adjusted responsive thereto. A signal, representing the difference between the overhead product flow rate in line 51 and the adjusted setpoint, is transmitted to control valve 53, the opening of which is regulated responsive thereto.

Since the quantity of product being removed through line 51 essentially determines the amount of overhead vaporous material withdrawn through line 6, regulating the former effectively adjusts the quantity of reflux introduced into the column by way of line 18. It will be noticed that the particular loci of temperature sensors 35a, 36a, 40a and 41a, in accordance with the present invention, affords virtually immediate regulation of the reflux rate in response to changes in reflux rate, feed stream enthalpy both above and below the feed tray and in the heat-input to the reboiler section, at the locations of the immediate effects of these changes.

As hereinbefore stated, atmospheric changes, particularly those which occur suddenly, exert an effect upon the reflux returned to the column and affect, therefore, the overall column heat balance. This is especially the situation where, as illustrated in the drawing, the vaporous overhead material is first introduced into a common fin-fan cooler. To counteract these effects, a pair of temperature sensors 57a and 58a sense the temperature of the vaporous material in line 6 and the liquid reflux return in line 18, respectively. These temperature sensors are in communication with Internal Reflux Modulator (IRM) 55, by way of instrument lines 57 and 58. IRM 55 also receives a signal, representative of the overhead product flow rate in line 51, from FRC 47, via line 54, and a signal, representative of the total external reflux in line 18, from FRC 21, via line 59. The modulator computes the amount of internal reflux which flows downwardly below the tray which the overhead product is removed. An output signal is developed by IRM 55 and transmitted through instrument line 56 to FRC 21, wherein it is considered in determining the required flow rate of total reflux from receiver 14 through line 18.

The foregoing clearly illustrates the present control system for maintaining thermal balance within a fractionation column, and the method by which it is utilized. The advantages attendant the selected location of the six temperature sensors, as well as the pairing thereof to obtain three temperature differentials, will become apparent to those having the requisite skill in the art.

I claim as my invention:

1. In a fractionating column wherein (i) a mixed-component feed stream is introduced through a locus intermediate the top and bottom thereof; (ii) liquid bottoms material is recovered from the lower end of said column, and at least a portion thereof is partially vaporized and returned to the reboiler section of said column; (iii) a vaporous overhead stream is withdrawn from the upper end of said column, is at least partially condensed and returned to the upper section of said fractionating column as a reflux stream; and, (iv) a liquid overhead stream is withdrawn from said column, through a locus below that through which said reflux stream is returned, as an overhead product stream, the control system which comprises, in cooperative combination:

a. a first pair of vertically-spaced temperature sensors below said feed locus and proximate thereto, a first differential-temperature measuring device connected to said first pair of temperature sensors and, first control means co-acting with said first differential-temperature measuring device and regulating the degree to which the portion of said liquid bottoms material is vaporized;

b. a second pair of vertically-spaced temperature sensors below said feed locus, one of which is proximate thereto and the second of which is proximate to the locus through which said partially vaporized liquid bottoms material is returned to said reboiler section and, a second differential-temperature measuring device connected to said second pair of temperature sensors;

c. a third pair of vertically-spaced temperature sensors above said feed locus, one of which is proximate thereto and the second of which is proximate to the locus through which said overhead reflux is returned and, a third differential-temperature measuring device connected to said third pair of temperature sensors;

d. a fourth pair of temperature sensors sensing the temperature of said overhead vaporous stream and the temperature of said returned reflux stream, a fourth differential-temperature measuring device connected to said fourth pair of temperature sensors and co-acting with second control means for regulating the quantity of said reflux stream; and e. a differential-temperature computing device connected to both of said second and third differential-temperature measuring devices, co-acting with third control means for regulating the quantity of said overhead product stream, and co-acting with said second control means for regulating the quantity of said reflux stream.

2. A method for maintaining the heat balance of a fractionation column, wherein (i) a mixed-component feed stream is introduced through a locus intermediate the top and bottom; (ii) liquid bottoms material is recovered from the lower end, and at least a portion thereof is partially vaporized and returned to the reboiler section; and, (iii) overhead material is recovered from the upper end, condensed and at least a portion thereof is returned to the upper section of said fractionating column as a reflux stream, which method comprises the steps of:
a. sensing a first temperature differential between two vertically-spaced, temperature-sensing points, both of which are below said feed locus and proximate thereto, measuring said first temperature differential, generating a first signal representative thereof and regulating the degree to which the portion of said liquid bottoms material is vaporized in response to said first output signal;
b. sensing a second temperature differential between two vertically-spaced, temperature-sensing points below said feed locus, one of which is proximated to said feed locus and the second of which is proximate to the locus through which said partially-vaporized liquid bottoms material is returned, measuring said second temperature differential and generating a second signal representative thereof;
c. sensing a third differential between two vertically-spaced, temperature-sensing points above said feed locus, one of which is proximate thereto and the second of which is proximate to the locus through which said reflux stream is introduced, measuring said third temperature differential and generating a third signal representative thereof; and,
d. measuring the difference between said second and third temperature differentials, responsive to said second and third signals, generating a fourth signal representative of the resulting difference and regulating the quantity of said overhead material, returned to said upper portion of said fractionating column as the reflux stream, in response to said fourth signal.

3. The method of claim 2 further characterized in that said fourth signal regulates the quantity of said overhead material recovered as an overhead product stream, the remainder of said material being returned to the column as said reflux stream.

* * * * *